(12) United States Patent
Jeon et al.

(10) Patent No.: US 10,396,398 B2
(45) Date of Patent: Aug. 27, 2019

(54) SECONDARY BATTERY

(71) Applicant: SAMSUNG SDI CO., LTD., Yongin-si, Gyeonggi-do (KR)

(72) Inventors: BokKyu Jeon, Yongin-si (KR); JungHyun Nam, Yongin-si (KR); YeonJoo Choi, Yongin-si (KR); Hoon Seok, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 345 days.

(21) Appl. No.: 15/452,031

(22) Filed: Mar. 7, 2017

(65) Prior Publication Data

US 2017/0263977 A1    Sep. 14, 2017

(30) Foreign Application Priority Data

Mar. 9, 2016 (KR) .................. 10-2016-0028294

(51) Int. Cl.
*H01M 10/0565* (2010.01)
*H01M 4/38* (2006.01)
(Continued)

(52) U.S. Cl.
CPC ....... *H01M 10/0565* (2013.01); *H01M 4/134* (2013.01); *H01M 4/136* (2013.01); *H01M 4/5825* (2013.01); *H01M 4/622* (2013.01); *H01M 4/625* (2013.01); *H01M 4/661* (2013.01); *H01M 10/052* (2013.01); *H01M 10/0525* (2013.01); *H01M 2/14* (2013.01); *H01M 2/1686* (2013.01); *H01M 4/0404* (2013.01); *H01M 4/0435* (2013.01); *H01M 4/0471* (2013.01); *H01M 4/1395* (2013.01);
(Continued)

(58) Field of Classification Search
CPC ..... H01M 10/0565; H01M 2300/0082; H01M 2300/0094; H01M 10/0562; H01M 2/14; H01M 2/1686
See application file for complete search history.

(56) References Cited

U.S. PATENT DOCUMENTS

| 5,312,910 A | 5/1994 | Kishore et al. |
| 8,404,386 B2 * | 3/2013 | Kimura ............... H01M 4/382 |
| | | 429/231.95 |
| 9,391,344 B2 | 7/2016 | Kwon et al. |

FOREIGN PATENT DOCUMENTS

| EP | 0 466 302 A1 | 1/1992 |
| KR | 10-2013-0004090 A | 1/2013 |

OTHER PUBLICATIONS

Cheung, et al. "Electrochemical and Solid State NMR Characterization of Composite PEO-Based Polymer Electrolytes" Electrochimica Acta 48 (2003) pp. 2149-2156.

\* cited by examiner

*Primary Examiner* — Stewart A Fraser
*Assistant Examiner* — Rachel L Zhang
(74) *Attorney, Agent, or Firm* — Lee & Morse, P.C.

(57) ABSTRACT

A secondary battery includes a cathode; an anode; and an electrolyte between the cathode and the anode, wherein the electrolyte includes a first electrolyte layer including a first polymer, a first lithium salt, and a first particle inorganic material having an average particle diameter (D50) of less than 500 nm; and a second electrolyte layer including a second polymer, a second lithium salt, and a second particle inorganic material having an average particle diameter (D50) of 500 nm or greater, wherein the first electrolyte layer is disposed in a direction facing the anode.

17 Claims, 5 Drawing Sheets

(51) Int. Cl.
    *H01M 10/0525* (2010.01)
    *H01M 4/136* (2010.01)
    *H01M 4/58* (2010.01)
    *H01M 4/62* (2006.01)
    *H01M 4/134* (2010.01)
    *H01M 4/66* (2006.01)
    *H01M 10/052* (2010.01)
    *H01M 2/16* (2006.01)
    *H01M 2/14* (2006.01)
    *H01M 4/04* (2006.01)
    *H01M 4/1395* (2010.01)
    *H01M 4/1397* (2010.01)
    *H01M 4/02* (2006.01)
    *H01M 4/40* (2006.01)

(52) U.S. Cl.
    CPC .......... *H01M 4/1397* (2013.01); *H01M 4/382* (2013.01); *H01M 4/405* (2013.01); *H01M 2004/027* (2013.01); *H01M 2004/028* (2013.01); *H01M 2220/20* (2013.01); *H01M 2220/30* (2013.01); *H01M 2300/0082* (2013.01); *H01M 2300/0094* (2013.01); *Y02T 10/7011* (2013.01)

SECONDARY BATTERY

CROSS-REFERENCE TO RELATED APPLICATION

Korean Patent Application No. 10-2016-0028294, filed on Mar. 9, 2016, in the Korean Intellectual Property Office, and entitled: "Secondary Battery," is incorporated by reference herein in its entirety.

BACKGROUND

1. Field

One or more embodiments relate to a secondary battery.

2. Description of the Related Art

Among secondary batteries, lithium secondary batteries are widely used in small-sized high-technology electronic devices, such as mobile devices and laptop computers. Also, mid-sized to large-sized batteries have been developed. The development of electrochemically stable lithium secondary batteries having high capacity is in progress particularly due to the wide use of electric vehicles (EVs).

SUMMARY

Embodiments are directed to a secondary battery including a cathode, an anode, and an electrolyte between the cathode and the anode. The electrolyte includes a first electrolyte layer including a first polymer, a first lithium salt, and a first particle inorganic material having an average particle diameter (D50) of less than 500 nm, and a second electrolyte layer including a second polymer, a second lithium salt, and a second particle inorganic material having an average particle diameter (D50) of 500 nm or greater. The first electrolyte layer is in a direction facing the anode.

The first particle inorganic material in the first electrolyte layer may have an average particle diameter (D50) in a range of about 10 nm to about 300 nm.

The second particle inorganic material in the second electrolyte layer may have an average particle diameter (D50) in a range of about 500 nm to about 1 µm.

A total thickness of the first electrolyte layer and the second electrolyte layer may be 20 µm or less.

A thickness of the first electrolyte layer may be less than a thickness of the second electrolyte layer.

A thickness of the first electrolyte layer may be in a range of about 1 µm to about 10 µm.

The first particle inorganic material and the second particle inorganic material may each independently include at least one selected from $Al_2O_3$, $SiO_2$, $TiO_2$, $ZnO$, $BaTiO_3$, and an inorganic composite that is surface modified with an ion conductive oligomer or an ionic salt on a surface thereof.

An amount of the first particle inorganic material and the second particle inorganic material may be in a range of about 1 part to 30 parts by weight based on 100 parts by weight of the total amount of the first polymer and the second polymer.

The first polymer and the second polymer may each independently include at least one selected from polyalkylene oxide, poly(vinylidene fluoride), poly(hexafluoropropylene), polycarbonate, phosphate ester polymers, polyalkylimine, polyacrylonitrile, poly(meth)acrylic acid ester, phosphonitrile chloride, polyurethane, polyamide, polyester, polysiloxane, and a derivative thereof.

A weight average molecular weight of the first polymer and the second polymer may be in a range of about 100,000 g/mol to about 300,000 g/mol.

The first lithium salt and the second lithium salt may each independently include at least one selected from LiSCN, $LiN(CN)_2$, $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2F)_2$, $LiN(SO_2CF_3)_2$, $LiN(SO_2C_2F_5)_2$, $LiSbF_6$, $LiPF_3(CF_2CF_3)_3$, $LiPF_3(CF_3)_3$, and $LiB(C_2O_4)_2$.

An amount of the first lithium salt and the second lithium salt may be in a range of about 50 parts to about 100 parts by weight based on 100 parts by weight of the total amount of the first polymer and the second polymer.

The electrolyte may be a solid electrolyte.

The electrolyte may be in a form of a film or sheet.

The anode may be a lithium metal or a lithium-containing alloy.

The cathode may include at least one cathode active material selected from lithium cobalt oxide, lithium nickel cobalt manganese oxide, lithium nickel cobalt aluminum oxide, lithium iron phosphate, and lithium manganese oxide.

The electrolyte may further include a separator.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
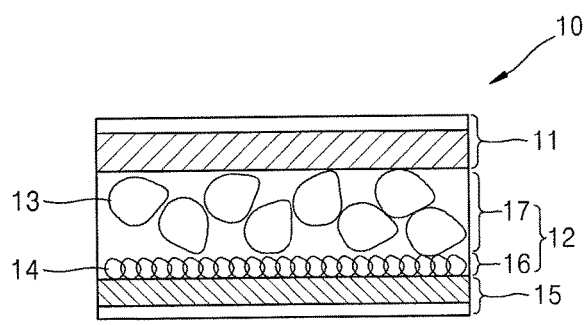
FIG. 1 illustrates a schematic view of a lithium secondary battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

FIG. 1 illustrates a schematic view of a secondary battery 10 according to an embodiment.

As shown in FIG. 1, the secondary battery 10 according to an embodiment may include a cathode 11, an anode 15, and an electrolyte 12 between the cathode 11 and the anode 15. The electrolyte 12 may include a first electrolyte layer 16 including a first polymer, a first lithium salt, and a first particle inorganic material 14 having an average particle diameter (D50) of less than 500 nm; and a second electrolyte layer 17 including a second polymer, a second lithium salt, and a second particle inorganic material 13 having an average particle diameter (D50) of 500 nm or greater. The first electrolyte layer 16 may be disposed in a direction facing the anode 15.

The secondary battery 10 may include the electrolyte 12, which includes the first electrolyte layer 16 including the first polymer, the first lithium salt, and the first particle inorganic material 14 having an average particle diameter (D50) of less than 500 nm, and the second electrolyte layer 17 including the second polymer, the second lithium salt, and the second particle inorganic material 13 having an average particle diameter (D50) of 500 nm or greater, wherein the first electrolyte layer 16 is disposed in a direction facing the anode 15.

In an embodiment, the first electrolyte layer 16 including the first particle inorganic material 14 having an average particle diameter (D50) of less than 500 nm may be disposed in a direction facing the anode 15. Herein, the description that the first electrode layer 16 is "in a direction facing the anode 15" indicates that the first electrode layer 16 is next to the anode 15 and the second electrode layer 17 is on an opposite side of the first electrode layer 16 from the anode 15. For example, the first electrolyte layer 16 may be directly adjacent to or in contact with the anode 15. When the first electrolyte layer 16 includes the first polymer and the first lithium salt, the electrolyte 12 may have ion conductivity. A shape of the electrolyte 12, e.g., a film-like shape, may be maintained, and the electrolyte 12 may have suitable elasticity and strength. In first electrolyte layer 16, the first particle inorganic material 14 may be homogenously dispersed in a matrix of the first polymer and the first lithium salt. In this regard, the first electrolyte layer 16 may have tortuosity on a surface of the anode 15 during a charging process of the secondary battery 10. Accordingly, dendrite growth may be suppressed, and thus, lifespan characteristics of the secondary battery 10 may be improved.

On the other hand, if the second electrolyte layer 17 including the second particle inorganic material 13 having an average particle diameter (D50) of 500 nm or greater in the electrolyte 12 were to be disposed in a direction facing the anode 15, for example, directly adjacent to or contacting the anode 15, the second particle inorganic material 13 may not be homogenously dispersed in a matrix of the second polymer and the second lithium salt, in which case, a short may occur to a surface of the anode 15 during a charging process of the secondary battery 10.

The first particle inorganic material 14 may have an average particle diameter (D50) in a range of, for example, about 10 nm to about 300 nm. For example, the first particle inorganic material 14 may have an average particle diameter (D50) in a range of about 10 nm to about 200 nm. For example, the first particle inorganic material 14 may have an average particle diameter (D50) in a range of about 10 nm to about 100 nm.

The second particle inorganic material 13 may have an average particle diameter (D50) in a range of, for example about 500 nm to about 1 μm.

When average particle diameters (D50) of the first electrolyte layer 16 including the first particle inorganic material and the second electrolyte layer 17 including the second particle inorganic material are within the respective ranges, the electrolyte 12 may have appropriately maintained ion conductivity and excellent mechanical properties.

The total thickness of the first electrolyte layer 16 and second electrolyte layer 17 may be 20 μm or less.

A thickness of the first electrolyte layer 16 may be less than a thickness of the second electrolyte layer 17. For example, a thickness of the first electrolyte layer 16 may be in a range of about 1 μm to about 10 μm. For example, a thickness of the first electrolyte layer 16 may be in a range of about 2 μm to about 9 μm. For example, a thickness of the first electrolyte layer 16 may be in a range of about 3 μm to about 7 μm.

When the total thickness of the first electrolyte layer 16 and the second electrolyte layer 17 is within the above described range of total thickness, and/or a thickness of the first electrolyte layer 16 is within above-described range of first electrolyte layer thickness, an internal resistance of the secondary battery 10 may be small. In this regard, lifespan characteristics of the secondary battery 10 may be improved.

The first particle inorganic material and the second particle inorganic material may each independently include at least one selected from $Al_2O_3$, $SiO_2$, $TiO_2$, ZnO, $BaTiO_3$, and an inorganic composite that is surface modified with an ion conductive oligomer or an ionic salt on a surface thereof.

The ion conductive oligomer may include at least one selected from poly(ethylene oxide) (PEO), poly(propylene oxide) (PPO), poly(butylene oxide) (PBO), polysiloxane, poly(ethylene glycol) (PEG), poly(propylene glycol) (PPG), poly(oxyethylene)methacrylate (POEM), poly(ethylene glycol)diacrylate (PEGDA), poly(propylene glycol)diacrylate (PPGDA), poly(ethylene glycol)dimethacrylate (PEGDMA), poly(propylene glycol)dimethacrylate (PPGDMA), poly(ethylene glycol)urethane diacrylate, poly (ethylene glycol)urethane dimethacrylate, polyester diacrylate, polyester dimethacrylate (polyester dimethacrylate), poly(ethylene glycol)urethane triacrylate, poly(ethylene glycol), poly (ethyleneglycol)urethane trimethacrylate, trimethylolpropane triacrylate, trimethylolpropane trimethacrylate, poly(ethylene oxide) grafted poly(methyl methacrylate) (PEO grafted PMMA), poly(propylene oxide) grafted poly (methyl methacrylate) (PPO grafted PMMA), poly(butylene oxide) grafted poly(methyl methacrylate) (PBO grafted PMMA), polysiloxane grafted poly(methyl methacrylate) (polysiloxane grafted PMMA), poly(ethylene glycol) (PEG) grafted poly(methyl methacrylate) (PBO grafted PMMA), poly(propylene glycol) (PPG) grafted poly(methyl methacrylate) (PMMA grafted PBO), an ethoxy group substituted with trimethylolpropane triacrylate, and a propoxy group substituted with trimethylolpropane triacrylate. For example, a weight average molecular weight (Mw) of the ion conductive oligomer may be in a range of about 50 to about 20,000.

The ionic salt may include at least one selected from $LiSO_3$ and $Li(SO_3BF_3)$.

The inorganic composite that is surface modified with an ion conductive oligomer or an ionic salt may be an inorganic composite that has a functional group attached on a surface of the first particle inorganic material and the second particle inorganic material, wherein the functional group is included in the ion conductive oligomer or the ionic salt.

For example, the first particle inorganic material and the second particle inorganic material may each independently include at least one selected from $Al_2O_3$, $SiO_2$, $TiO_2$, ZnO, and $BaTiO_3$. For example, the first particle inorganic material and the second particle inorganic material may be $Al_2O_3$. In $Al_2O_3$, $Al^{3+}$ ions may be substituted to $Li^+$ sites, and thus ion conductivity of the electrolyte may improve due to formation of Li vacancy.

An amount of the first particle inorganic material and the second particle inorganic material may be in a range of about 1 part to about 30 parts by weight based on 100 parts by weight of the total amount of the polymer, i.e. the first polymer and the second polymer. When the amount of the first particle inorganic material and the second particle inorganic material is within this range, ion conductivity and mechanical properties such as, ductility, elasticity, and rigidity of an electrolyte including the inorganic materials may improve.

The first polymer and the second polymer may each independently include at least one selected from polyalkylene oxide, poly(vinylidenefluoride), poly(hexafluoropropylene), polycarbonate, phosphate ester polymers, polyalkylimine, polyacrylonitrile, poly(meth)acrylic acid ester, phosphonitrile chloride, polyurethane, polyamide, polyester, polysiloxane, and derivatives thereof. The polyalkylene oxide may include a polyethylene oxide or a polypropylene oxide, as examples. The first polymer and the second polymer may be polyurethane, as an example. The first polymer and the second polymer may be thermoplastic polyurethane, as an example.

A weight average molecular weight (Mw) of the first polymer and the second polymer may be in a range of about 100,000 g/mol to about 300,000 g/mol. For example, a weight average molecular weight (Mw) of the first polymer and the second polymer may be in a range of about 100,000 g/mol to about 200,000 g/mol.

The first polymer and the second polymer may provide an electrolyte having excellent ion conductivity and excellent mechanical properties such as elasticity, ductility, and rigidity at the same time.

The first lithium salt and the second lithium salt may each independently include at least one selected from LiSCN, $LiN(CN)_2$, $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2F)_2$, $LiN(SO_2CF_3)_2$, $LiN(SO_2CF_2CF_3)_2$, $LiSbF_6$, $LiPF_3(CF_2CF_3)_3$, $LiPF_3(CF_3)_3$, and $LiB(C_2O_4)_2$.

An amount of the first lithium salt and the second lithium salt may be in a range of about 50 parts to about 100 parts by weight based on 100 parts by weight of the total polymer, i.e. the first polymer and the second polymer.

The first lithium salt and the second lithium salt may provide lithium cations to the first polymer and the second polymer to provide an electrolyte having excellent ion conductivity.

The electrolyte 12 may be a solid electrolyte. The secondary battery 10 may be an all-solid secondary battery. The electrolyte 12 may be in the form of a film or a sheet. For example, the electrolyte 12 may be in the form of a film. The electrolyte 12 may serve as an electrolyte membrane that may also function as a separator.

The secondary battery 10 may be a lithium secondary battery.

In some embodiments, the lithium secondary battery may be manufactured in the following manner.

First, a cathode is prepared. The cathode may be one of a variety of types.

For example, a cathode active material, a conducting agent, a binder, and a solvent may be mixed to prepare a cathode active material composition. In some embodiments, the cathode active material composition may be directly coated onto a metallic current collector to prepare a cathode plate. In some embodiments, the cathode active material composition may be cast onto a separate support to form a cathode active material film, which may then be separated from the support and laminated onto a metallic current collector to prepare a cathode plate.

The cathode active material may be a suitable available cathode active material. For example, the cathode active material may be a lithium-containing metal oxide. In some embodiments, the cathode active material may be at least one of a composite oxide of lithium with a metal selected from among Co, Mn, Ni, and a combination thereof. In some embodiments, the cathode active material may be a compound represented by one of the following formulae:
$Li_aAl_{1-b}B^1{}_bD1_2$ (where $0.90 \leq a \leq 1.8$ and $0 \leq b \leq 0.5$); $Li_aE_{1-b}B^1{}_bO_{2-c}D^1{}_c$ (where $0.90 \leq a \leq 1.8$, $0 \leq b \leq 0.5$, and $0 \leq c \leq 0.05$); $LiE_{2-b}B^1{}_bO_{4-c}D^1{}_c$ (where $0 \leq b \leq 0.5$, and $0 \leq c \leq 0.05$); $Li_aNi_{1-b-c}Co_bB^1{}_cD^1{}_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB^1{}_cO_{2-\alpha}F^1{}_\alpha$ (where $0.90 \leq a \leq 1.8$, $0 \leq b \leq 0.5$, $0 \leq c \leq 0.05$, and $0 < \alpha < 2$); $Li_aNi_{1-b-c}Co_bB^1{}_cO_{2-\alpha}F^1{}_\alpha$ (where $0.90 \leq a \leq 1.8$, $0 \leq c \leq 0.05$, and $0 < \alpha < 2$); $Li_aNi_{1-b-c}Mn_bB^1{}_cD^1{}_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB^1{}_cO_{2-\alpha}F_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB^1{}_cO_{2-\alpha}F^1{}_2$ (where $0.90 \leq a \leq 1.8$, $0 \leq b \leq 0.5$, $0 \leq c \leq 0.05$, and $0 < \alpha < 2$); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dG_eO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$ and $0.001 \leq b \leq 0.1$); $Li_aCoG_bO_2$ (where $0.90 \leq a \leq 1.8$ and $0.001 \leq b \leq 0.1$); $Li_aMnG_bO_2$ (where $0.90 \leq a \leq 1.8$ and $0.001 \leq b \leq 0.1$); $Li_aMn_2GbO_4$ (where $0.90 \leq a \leq 1.8$ and $0.001 \leq b \leq 0.1$); $QO_2$; $QS_2$; $LiQS_2$; $V_2O_5$; $LiV_2O_5$; $LiI^1O_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the formulae above, A may be selected from nickel (Ni), cobalt (Co), manganese (Mn), and combinations thereof; $B^1$ may be selected from aluminum (Al), nickel (Ni), cobalt (Co), manganese (Mn), chromium (Cr), iron (Fe), magnesium (Mg), strontium (Sr), vanadium (V), a rare earth element, and combinations thereof; $D^1$ may be selected from oxygen (O), fluorine (F), sulfur (S), phosphorus (P), and combinations thereof; E may be selected from cobalt (Co), manganese (Mn), and combinations thereof; $F^1$ may be selected from fluorine (F), sulfur (S), phosphorus (P), and combinations thereof; G may be selected from aluminum (Al), chromium (Cr), manganese (Mn), iron (Fe), magnesium (Mg), lanthanum (La), cerium (Ce), strontium (Sr), vanadium (V), and combinations thereof; Q is selected from titanium (Ti), molybdenum (Mo), manganese (Mn), and combinations thereof; $I^1$ is selected from chromium (Cr), vanadium (V), iron (Fe), scandium (Sc), yttrium (Y), and combinations thereof; and J may be selected from vanadium (V), chromium (Cr), manganese (Mn), cobalt (Co), nickel (Ni), copper (Cu), and combinations thereof.

For example, the cathode active material may include at least one selected from lithium cobalt oxide, lithium nickel cobalt manganese oxide, lithium nickel cobalt aluminum oxide, lithium iron phosphate, and lithium manganese oxide.

For example, the cathode active material may include at least one selected from $LiCoO_2$, $LiMn_xO_{2x}$ (where x=1 or 2), $LiNi_{1-x}Mn_xO_{2x}$ (where $0<x<1$), $LiNi_{1-x-y}Co_xMn_yO_2$ (where $0 \leq x \leq 0.5$ and $0 \leq y \leq 0.5$), and $LiFePO_4$.

The compounds listed above as cathode active materials may have a surface coating layer (hereinafter, also referred to as "coating layer"). In some implementations, a mixture of a compound without a coating layer and a compound having a coating layer, the compounds being selected from the compounds listed above, may be used. In some embodiments, the coating layer may include at least one compound of a coating element selected from the group of oxide, hydroxide, oxyhydroxide, oxycarbonate, and hydroxycarbonate of the coating element. In some embodiments, the compounds for the coating layer may be amorphous or crystalline. In some embodiments, the coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. In some embodiments, the coating layer may be formed using any method that does not adversely affect the physical properties of the cathode active material when a compound of the coating element is used. For example, the coating layer may be formed using a suitable coating method, such as a spray coating method, or a dipping method.

The conducting agent may be a suitable conducting agent such as carbon black or graphite particulates.

A suitable binder may be used. Examples of the binder include a vinylidene fluoride/hexafluoropropylene copolymer, polyvinylidene fluoride (PVDF), polyacrylonitrile, polymethylmethacrylate, polytetrafluoroethylene, mixtures thereof, and a styrene butadiene rubber polymer.

A suitable solvent may be used. Examples of the solvent include N-methyl-pyrrolidone, acetone, and water.

The amounts of the cathode active material, the conducting agent, the binder, and the solvent may be in ranges that are generally used in lithium secondary batteries. At least one of the conducting agent, the binder, and the solvent may be omitted depending on the use and the structure of the lithium secondary battery.

Next, an anode is prepared.

The anode may be or include a lithium metal or a lithium-containing alloy.

Examples of the lithium-containing alloy may include Si, Sn, Al, Ge, Pb, Bi, Sb, a Si—Y' alloy (where Y' is an alkali metal, an alkali earth metal, a Group XIII element, a Group XIV element, a transition metal, a rare earth element, or a combination thereof, and Y' is not Si), and a Sn—Y' alloy (where Y' is an alkali metal, an alkali earth metal, a Group XIII element, a Group XIV element, a transition metal, a rare earth element, or a combination thereof, and Y' is not Sn). In some embodiments, Y' may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), or tellurium (Te), or combinations thereof. Next, a separator to be disposed between the cathode and the anode may be prepared.

The separator for the lithium battery may be any separator that is commonly used in lithium secondary batteries. In some embodiments, the separator may have low resistance to migration of ions in an electrolyte and have an excellent electrolyte-retaining ability. Examples of the separator include glass fiber, polyester, Teflon, polyethylene, polypropylene, polytetrafluoroethylene (PTFE), and a combination thereof, each of which may be a non-woven or woven fabric. For example, a rollable separator including polyethylene or polypropylene may be used for a lithium ion battery. A separator having a good organic electrolytic solution-retaining ability may be used for a lithium ion polymer battery. For example, the separator may be manufactured in the following manner.

In some embodiments, a polymer resin, a filler, and a solvent may be mixed together to prepare a separator composition. Then, the separator composition may be directly coated onto an electrode, and then dried to form the separator. In some embodiments, the separator composition may be cast onto a support and then dried to form a separator film, which may then be separated from the support and laminated on an electrode to form the separator.

The polymer resin used to manufacture the separator may be any material that is commonly used as a binder for electrode plates. Examples of the polymer resin include a vinylidenefluoride/hexafluoropropylene copolymer, PVDF, polyacrylonitrile, polymethylmethacrylate, and a mixture thereof.

Then, an electrolyte is prepared.

For example, the electrolyte may be one described above.

Figure 2:
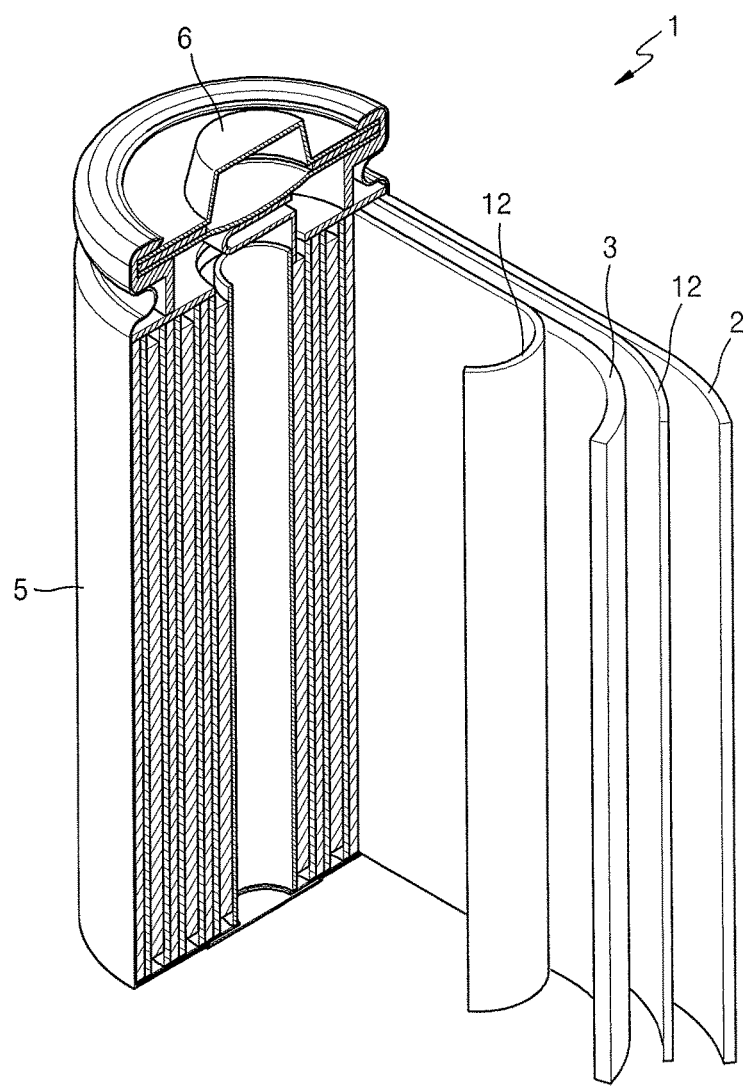
FIG. 2 illustrates a perspective view of a structure of a cylinder-type lithium secondary battery according to an embodiment.

FIG. 2 illustrates a perspective view of a structure of a cylinder-type lithium secondary battery 100 according to an embodiment.

As shown in FIG. 2, the lithium secondary battery 1 includes a cathode 3, an anode 2, and the electrolyte 12 as described above. In some embodiments, the cathode 3, the anode 2, and the electrolyte 12 may be wound or folded, and then accommodated in a battery case 5. Subsequently, the battery case 5 may be sealed with a cap assembly 6, thereby completing the manufacture of the lithium secondary battery 1. In some embodiments, the battery case 5 may be a cylindrical type, a rectangular type, or a thin-film type. For example, the lithium secondary battery 1 may be a thin-film type battery. In some embodiments, the lithium battery 1 may be a lithium ion battery.

In some embodiments, the electrolyte may be disposed between the cathode and the anode to form a battery assembly. In some embodiments, the battery assembly may be stacked in a bi-cell structure and impregnated with an electrolytic solution. In some embodiments, the resultant assembly may be put into a pouch and hermetically sealed, thereby completing the manufacture of a lithium ion polymer battery.

In some embodiments, a plurality of battery assemblies may be stacked to form a battery pack, which may be used in any device that requires high capacity and high output, for example, in a laptop computer, a smart phone, or an electric vehicle.

The lithium secondary battery 1 may have improved lifetime characteristics and high rate characteristics, and thus may be used in an electric vehicle (EV), for example, in a hybrid vehicle such as a plug-in hybrid electric vehicle (PHEV). The lithium battery may be applicable to the high-power storage field. For example, the lithium battery may be used in an electric bicycle or a power tool.

Figure 3:
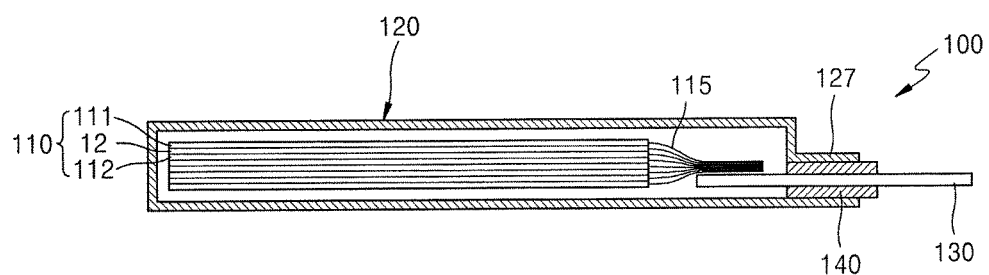
FIG. 3 illustrates a perspective view of a structure of a pouch-type lithium secondary battery according to an embodiment.

FIG. 3 illustrates a perspective view of a structure of a pouch-type lithium secondary battery 100 according to an embodiment.

Referring to FIG. 3, the pouch-type lithium secondary battery 100 may include an electrode assembly 110, a lid tab 130, and an external material 120. The pouch-type lithium secondary battery 100 according to an embodiment may be a rechargeable secondary battery that may be, for example, manufactured as a lithium-ion battery.

The electrode assembly 110 may be accommodated in the external material 120. The electrode assembly 110 may include a cathode 111, an anode 112, and the electrolyte 12 as described above, disposed between the cathode 111 and the anode 112. The electrode assembly 110 may be a stack-type electrode assembly including the cathode 111, the electrolyte 12, and the anode 112 that are stacked in this stated order. A plurality of sheets of the cathode 111, the electrolyte 12, and the anode 112 may be stacked to provide the pouch-type lithium secondary battery 100 having a high output and a high capacity.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

EXAMPLES

Manufacture of Lithium Secondary Battery

Example 1: Manufacture of Lithium Secondary Battery 1.1. Anode

An anode coated with a lithium metal at a thickness of about 8 um on a Cu substrate was prepared.

1.2. Electrolyte

A composition for forming a first electrolyte layer and a composition for forming a second electrolyte layer were sequentially cast on a glass substrate, N-methyl-2-pyrolidone (NMP) was slowly evaporated from the cast resultant in an argon glove box for 24 hours at about 25° C., and the resultant was dried in vacuum at 40° C. for 24 hours to prepare an electrolyte.

The composition for forming a first electrolyte layer was obtained by adding 15 parts by weight of $Al_2O_3$(D50=20 nm) and 80 parts by weight of lithium bis(trifluoromethane) sulfonamide (LiTFSI) based on 100 parts by weight of the total thermoplastic polyurethane to 15 wt % of a thermoplastic polyurethane-containing mixture including thermoplastic polyurethane (Mw=100,000 g/mol, available from Lubrizol) in NMP.

The composition for forming a second electrolyte layer was obtained in the same manner used to prepare the composition for forming a first electrolyte layer except using 15 parts by weight of $Al_2O_3$(D50=500 nm) instead of 15 parts by weight of $Al_2O_3$(D50=20 nm).

1.3. Cathode

A cathode active material, $LiFePO_4$ (available from BASF), and a conducting material, carbon black (ECP, available from Lion) were added to 15 wt % of a thermoplastic urethane-containing mixture including thermoplastic polyurethane (Mw=100,000 g/mol, available from Samchun Chemical) in NMP such that a weight ratio of the cathode active material, the conducting agent, and the thermoplastic polyurethane was 80:7:13. The mixture was coated onto an aluminum current collector having a thickness of about 15 μm at a thickness of about 100 μm, and the resultant was dried in a hot-air drier of 100° C. for 0.5 hour, dried once more in vacuum at 120° C. for 4 hours, and then roll-pressed to prepare a cathode having a cathode active material layer on the aluminum current collector.

An electrode assembly was prepared by sequentially stacking the 1.1. anode, the 1.2. electrolyte, and the 1.3. cathode in this stated order. The electrode assembly was accommodated in a pouch-type case, and edges of an upper case and a lower case of the pouch-type case were thermo-settingly sealed under a reduced-pressure to prepare a lithium secondary battery.

Comparative Example 1: Manufacture of Lithium Secondary Battery

An electrolyte was prepared in the same manner as in the preparation of the 1.2. electrolyte, except that only the composition for forming a second electrolyte layer was cast onto a glass substrate instead of sequentially casting the composition for forming a first electrolyte layer and the composition for forming a second electrolyte layer on a glass substrate, NMP was slowly evaporated from the cast resultant in a dry room for 1 hour at about 60° C., and the resultant was dried in vacuum at 70° C. for 1 hour.

An electrode assembly was prepared by sequentially stacking the 1.1. anode, the electrolyte thus prepared, and the 1.3. cathode in this stated order. The electrode assembly was accommodated in a pouch-type case, and edges of an upper case and a lower case of the pouch-type case were thermosettingly sealed under a reduced-pressure to prepare a lithium secondary battery.

Comparative Example 2: Preparation of Lithium Secondary Battery

An electrolyte was prepared in the same manner as in preparation of the 1.2. electrolyte, except that the composition for forming a second electrolyte layer and the composition for forming a first electrolyte layer were sequentially cast on a glass substrate instead of sequentially casting the composition for forming a first electrolyte layer and the composition for forming a second electrolyte layer on a glass substrate, NMP was slowly evaporated from the cast resultant in an argon glove box for 24 hours at about 25° C., and the resultant was dried in vacuum at 40° C. for 24 hours.

An electrode assembly was prepared by sequentially stacking the 1.1. anode, the electrolyte thus prepared, and the 1.3. cathode in this stated order. The electrode assembly was accommodated in a pouch-type case, and edges of an upper case and a lower case of the pouch-type case were thermosettingly sealed under a reduced-pressure to prepare a lithium secondary battery.

Battery Characteristic Evaluation

Evaluation Example 1: Cycle Test Evaluation

A first charging/discharging and cycle charging/discharging were performed on the lithium secondary batteries prepared in Example 1 and Comparative Example 1 at 25° C.

Figure 4:
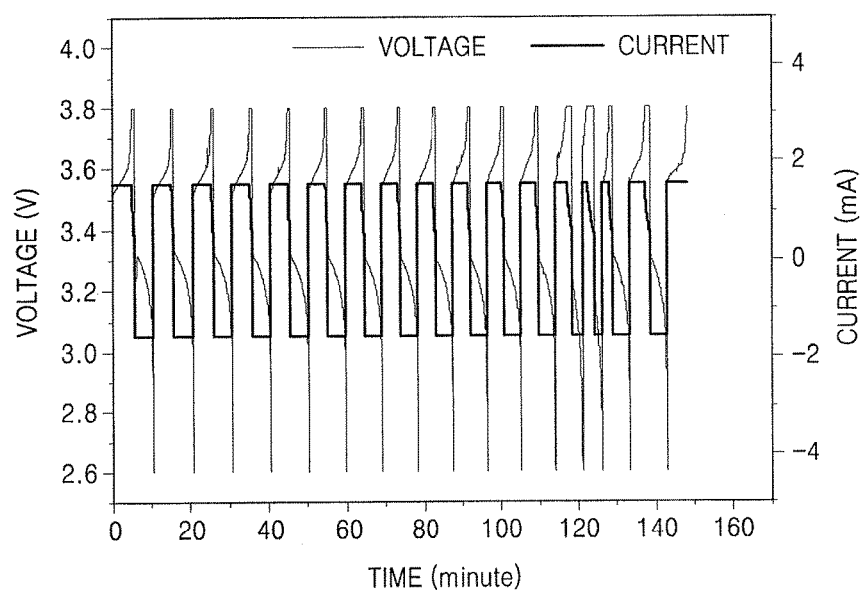
FIG. 4 illustrates the results of a cycle test up to the $17^{th}$ cycle performed on a lithium secondary battery prepared in Example 1.
Figure 5:
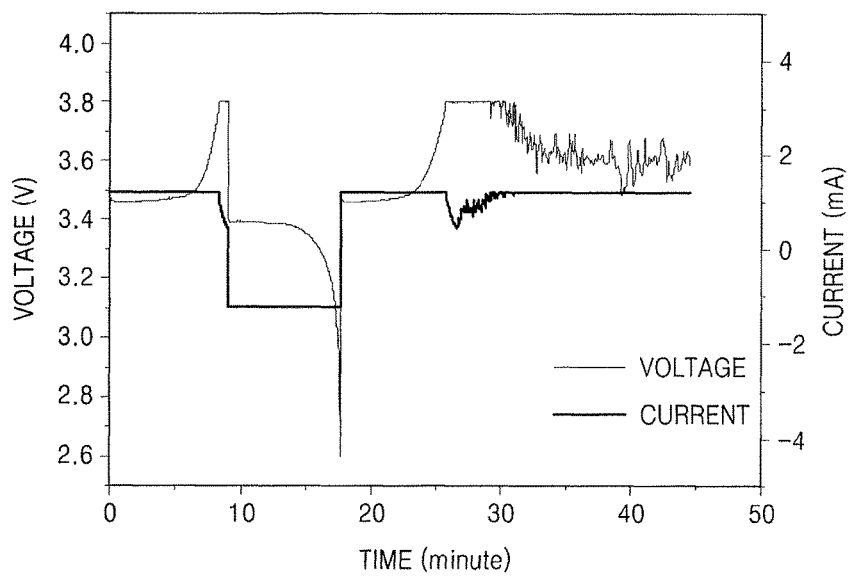
FIG. 5 illustrates the results of a cycle test up to the $10^{th}$ cycle performed on a lithium secondary battery prepared in Comparative Example 1.

For the first charging/discharging, the lithium secondary batteries prepared in Example 1 and Comparative Examples 1 and 2 were each charged until a voltage was 3.8 V with a constant current of 0.1 C and then discharged until a voltage was 2.6 V with a constant current of 0.1 C. From the second charging, the lithium secondary batteries were each 3.8V CC/CV 0.5 C charged and charged until a current was 0.05 C, and then 2.6V 0.2 C/1 C/2 C discharged. The cycle test evaluation was performed by 50 cycles of the 3.8V CC 1 C charging and 2.6V 1 C discharging. Some of the results are shown in FIG. 4, FIG. 5, and Table 1. A capacity retention rate (%) was obtained using Equation 1 below.

Capacity retention rate [%]=[(Discharge capacity at the $10^{th}$ cycle/discharge capacity at the $1^{st}$ cycle)×100]   [Equation 1]

TABLE 1

| | Capacity retention rate (%) |
|---|---|
| Example 1 | 99.9 |
| Comparative Example 1 | Short circuit occurred |

Referring to FIG. 4, FIG. 5, and Table 1, the lithium secondary battery prepared in Example 1 exhibited a normal charging/discharging cycle state up to the 17$^{th}$ cycle, and the capacity retention rate at the 10$^{th}$ cycle was 99.9%. A short circuit occurred in the lithium secondary battery prepared in Comparative Example 1 at the 10$^{th}$ cycle.

The 1$^{st}$ charging/discharging cycle was performed on the lithium secondary batteries prepared in Example 1 and Comparative Example 2 under the same test conditions as those of the first charging/discharging. The results are shown in FIG. 6 and FIG. 7.

Figure 6:
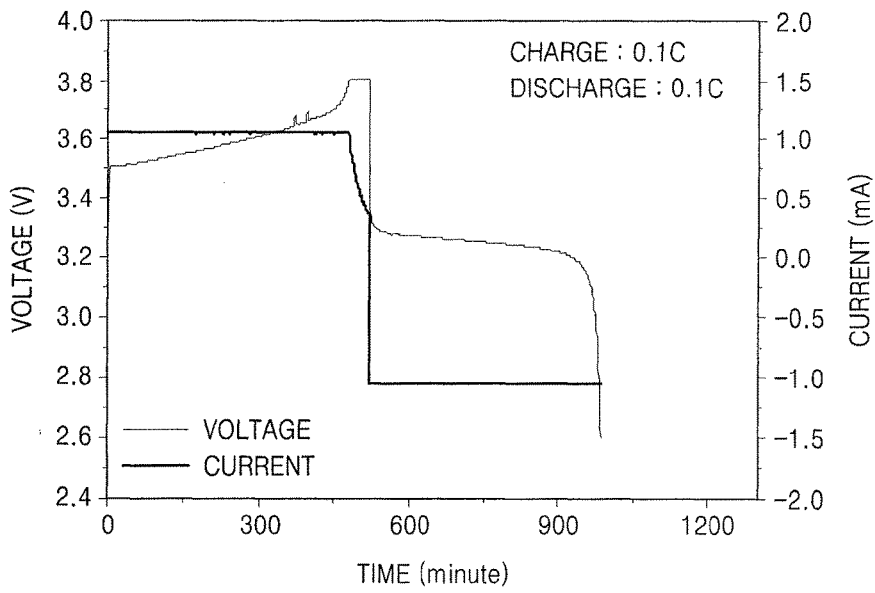
FIG. 6 illustrates the results of an initial cycle test performed on the lithium secondary battery prepared in Example 1.
Figure 7:
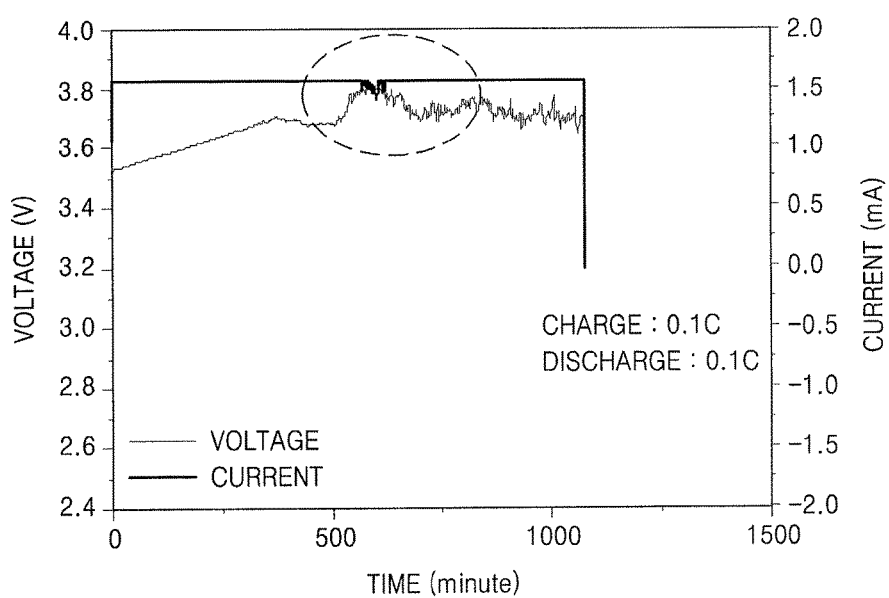
FIG. 7 illustrates the results of an initial cycle test performed on a lithium secondary battery prepared in Comparative Example 2.

Referring to FIG. 6 and FIG. 7, the lithium secondary battery prepared in Example 1 exhibited a normal charging/discharging cycle state at the initial cycle, but a short circuit occurred in the lithium secondary battery prepared in Comparative Example 2 at the initial cycle due to growth of lithium dendrite (in a dashed circle).

In this regard, it may be confirmed that the lithium secondary battery prepared in Example 1 has improved lifespan characteristics by delaying the growth of lithium dendrite.

By way of summation and review, in order to manufacture electrochemically stable lithium secondary batteries, a solid electrolyte has been recently used as an electrolyte. For example, such solid electrolyte is in the form of film which may thus replace a separator. However, the general solid electrolyte has a problem of shorts occurring due to lithium dendrite growth during the operation of the lithium secondary battery.

Therefore, there is demand for a secondary battery including an electrolyte having a novel structure for improved lifespan characteristics by suppressing growth of lithium dendrite while operating the lithium secondary battery.

As described above, according to one or more embodiments, a lithium secondary battery includes an electrolyte having inorganic particle materials with different average particle diameters (D50), wherein the electrolyte includes a first electrolyte layer including a first particle inorganic material and a second electrolyte layer including a second particle inorganic material, and the first electrolyte layer is disposed to face an anode, which suppresses growth of lithium dendrite, and thus the lifespan characteristics of the lithium secondary battery may improve.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A secondary battery, comprising:
   a cathode;
   an anode; and
   an electrolyte between the cathode and the anode,
   wherein the electrolyte includes:
      a first electrolyte layer including a first polymer, a first lithium salt, and a first particle inorganic material having an average particle diameter (D50) of less than 500 nm; and
      a second electrolyte layer including a second polymer, a second lithium salt, and a second particle inorganic material having an average particle diameter (D50) of 500 nm or greater,
   wherein the first electrolyte layer is in a direction facing the anode.

2. The secondary battery as claimed in claim 1, wherein the first particle inorganic material in the first electrolyte layer has an average particle diameter (D50) in a range of about 10 nm to about 300 nm.

3. The secondary battery as claimed in claim 1, wherein the second particle inorganic material in the second electrolyte layer has an average particle diameter (D50) in a range of about 500 nm to about 1 µm.

4. The secondary battery as claimed in claim 1, wherein a total thickness of the first electrolyte layer and the second electrolyte layer is 20 µm or less.

5. The secondary battery as claimed in claim 1, wherein a thickness of the first electrolyte layer is less than a thickness of the second electrolyte layer.

6. The secondary battery as claimed in claim 1, wherein a thickness of the first electrolyte layer is in a range of about 1 µm to about 10 µm.

7. The secondary battery as claimed in claim 1, wherein the first particle inorganic material and the second particle inorganic material each independently include at least one selected from $Al_2O_3$, $SiO_2$, $TiO_2$, ZnO, $BaTiO_3$, and an inorganic composite that is surface modified with an ion conductive oligomer or an ionic salt on a surface thereof.

8. The secondary battery as claimed in claim 1, wherein a total amount of the first particle inorganic material and the second particle inorganic material is in a range of about 1 part to 30 parts by weight based on 100 parts by weight of a total amount of the first polymer and the second polymer.

9. The secondary battery as claimed in claim 1, wherein the first polymer and the second polymer each independently include at least one selected from polyalkylene oxide, poly(vinylidene fluoride), poly(hexafluoropropylene), polycarbonate, phosphate ester polymers, polyalkylimine, polyacrylonitrile, poly(meth)acrylic acid ester, phosphonitrile chloride, polyurethane, polyamide, polyester, polysiloxane, and a derivative thereof.

10. The secondary battery as claimed in claim 1, wherein a weight average molecular weight of the first polymer and the weight average molecular weight of the second polymer are independently in a range of about 100,000 g/mol to about 300,000 g/mol.

11. The secondary battery as claimed in claim 1, wherein the first lithium salt and the second lithium salt each independently include at least one selected from LiSCN, $LiN(CN)_2$, $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2F)_2$, $LiN(SO_2CF_3)_2$, $LiN(SO_2C_2F_5)_2$, $LiSbF_6$, $LiPF_3(CF_2CF_3)_3$, $LiPF_3(CF_3)_3$, and $LiB(C_2O_4)_2$.

12. The secondary battery as claimed in claim 1, wherein a total amount of the first lithium salt and the second lithium salt is in a range of about 50 parts to about 100 parts by weight based on 100 parts by weight of a total amount of the first polymer and the second polymer.

13. The secondary battery as claimed in claim 1, wherein the electrolyte includes a solid electrolyte.

14. The secondary battery as claimed in claim 1, wherein the electrolyte is in a form of a film or sheet.

15. The secondary battery as claimed in claim 1, wherein the anode is a lithium metal or a lithium-containing alloy.

16. The secondary battery as claimed in claim 1, wherein the cathode includes at least one cathode active material selected from lithium cobalt oxide, lithium nickel cobalt manganese oxide, lithium nickel cobalt aluminum oxide, lithium iron phosphate, and lithium manganese oxide.

17. The secondary battery as claimed in claim 1, wherein the electrolyte further includes a separator.

* * * * *